US011262020B2

(12) United States Patent
Wenzel et al.

(10) Patent No.: US 11,262,020 B2
(45) Date of Patent: Mar. 1, 2022

(54) STANDING TOOL WITH TELESCOPIC ARM HAVING A GUIDE ROD

(71) Applicant: MILWAUKEE ELECTRIC TOOL CORPORATION, Brookfield, WI (US)

(72) Inventors: Duane W. Wenzel, Waukesha, WI (US); Brian Cornell, West Allis, WI (US)

(73) Assignee: MILWAUKEE ELECTRIC TOOL CORPORATION, Brookfield, WI (US)

(*) Notice: Subject to any disclaimer, the term of this patent is extended or adjusted under 35 U.S.C. 154(b) by 140 days.

(21) Appl. No.: 16/529,362

(22) Filed: Aug. 1, 2019

(65) Prior Publication Data

US 2020/0041065 A1 Feb. 6, 2020

Related U.S. Application Data

(60) Provisional application No. 62/713,885, filed on Aug. 2, 2018.

(51) Int. Cl.
*F16M 11/00* (2006.01)
*F16M 11/28* (2006.01)
*F16M 11/04* (2006.01)

(52) U.S. Cl.
CPC ............ *F16M 11/28* (2013.01); *F16M 11/04* (2013.01); *F16M 2200/08* (2013.01)

(58) Field of Classification Search
None
See application file for complete search history.

(56) References Cited

U.S. PATENT DOCUMENTS

| 3,526,765 A | 9/1970 | Rossi |
| 4,324,477 A | 4/1982 | Miyazaki |
| 4,989,123 A | 1/1991 | Best |
| 5,168,679 A * | 12/1992 | Featherstone ............. B66F 3/06 52/108 |
| 5,400,234 A | 3/1995 | Yu |

(Continued)

FOREIGN PATENT DOCUMENTS

| CN | 103133967 A | 6/2013 |
| JP | 2011108647 A | 6/2011 |

(Continued)

OTHER PUBLICATIONS

International Prelminary Report on Patentability for Application No. PCT/US2017/062962 dated Nov. 5, 2018, 28 pages.

(Continued)

*Primary Examiner* — Steven M Marsh
(74) *Attorney, Agent, or Firm* — Michael Best & Friedrich LLP

(57) ABSTRACT

A standing tool includes a body, a telescoping arm, a head unit, a cable, and a guide rod. The telescoping arm defines an axis therethrough and includes a base end coupled to the body and a distal end movable with respect to the base end. The head unit is coupled to the distal end of the telescoping arm and movable together therewith. The cable of the standing tool includes a first end fixed relative to the body, and a second end opposite the first end that is fixed relative to the head unit. The guide rod is coaxially aligned with the axis of the telescoping arm such that at least a portion of the cable is wrapped around the guide rod.

19 Claims, 11 Drawing Sheets

(56) References Cited

U.S. PATENT DOCUMENTS

| | | | |
|---|---|---|---|
| 5,428,520 A | 6/1995 | Skief | |
| 5,630,660 A | 5/1997 | Chen | |
| 5,934,628 A | 8/1999 | Bosnakovic | |
| 5,964,524 A | 10/1999 | Qian | |
| 6,099,142 A | 8/2000 | Liu | |
| 6,158,555 A * | 12/2000 | Brown, Jr. | H02G 11/003 138/120 |
| 6,213,626 B1 | 4/2001 | Qian | |
| 6,265,969 B1 | 7/2001 | Shih | |
| 6,474,844 B1 | 11/2002 | Ching | |
| 6,554,459 B2 | 4/2003 | Yu et al. | |
| 6,637,904 B2 | 10/2003 | Hernandez | |
| 6,824,297 B1 | 11/2004 | Lee | |
| 6,854,862 B1 | 2/2005 | Hopf | |
| 6,873,249 B2 | 3/2005 | Chu | |
| 6,877,881 B2 | 4/2005 | Tsao | |
| 6,899,441 B2 | 5/2005 | Chen | |
| 6,902,294 B2 | 6/2005 | Wright | |
| 6,923,416 B1 | 8/2005 | Hsieh | |
| 6,926,428 B1 | 8/2005 | Lee | |
| 7,001,044 B2 | 2/2006 | Leen | |
| 7,011,280 B2 | 3/2006 | Murray et al. | |
| 7,063,444 B2 | 6/2006 | Lee et al. | |
| 7,073,926 B1 | 7/2006 | Kremers et al. | |
| 7,121,688 B2 | 10/2006 | Rempel | |
| 7,152,997 B1 | 12/2006 | Kovacik et al. | |
| 7,195,377 B2 | 3/2007 | Tsai | |
| 7,224,271 B2 | 5/2007 | Wang | |
| 7,342,360 B2 | 3/2008 | Van Deursen et al. | |
| 7,364,320 B2 | 4/2008 | Van Deursen et al. | |
| 7,484,858 B2 | 2/2009 | Deighton et al. | |
| 7,503,530 B1 | 3/2009 | Brown | |
| 7,997,753 B2 | 8/2011 | Walesa et al. | |
| 8,007,145 B2 | 8/2011 | Leen | |
| 8,047,481 B2 | 11/2011 | Shen | |
| 8,087,797 B2 | 1/2012 | Pelletier et al. | |
| 8,142,045 B2 | 3/2012 | Peak | |
| 8,201,979 B2 | 6/2012 | Deighton et al. | |
| 8,262,248 B2 | 9/2012 | Wessel | |
| 8,328,398 B2 | 12/2012 | Van Deursen | |
| 8,599,097 B2 | 12/2013 | Intravatola | |
| 8,651,438 B2 | 2/2014 | Deighton et al. | |
| 8,659,443 B2 | 2/2014 | Mandel | |
| 8,696,177 B1 | 4/2014 | Frost | |
| 8,801,226 B2 | 8/2014 | Moore | |
| 8,939,602 B2 | 1/2015 | Wessel | |
| 9,039,231 B1 | 5/2015 | Barker et al. | |
| 9,090,202 B2 | 7/2015 | McLoughlin et al. | |
| 9,091,401 B2 | 7/2015 | Wong et al. | |
| 9,170,006 B2 | 10/2015 | Cugini et al. | |
| 9,222,633 B2 | 12/2015 | Inskeep | |
| 9,303,853 B2 | 4/2016 | Deighton et al. | |
| 9,574,725 B2 | 2/2017 | Pellenc | |
| 10,355,468 B2 * | 7/2019 | Alger, Jr. | H02G 11/006 |
| 2002/0094473 A1 | 7/2002 | Lin | |
| 2002/0136005 A1 | 9/2002 | Lee | |
| 2002/0167814 A1 | 11/2002 | Ching | |
| 2003/0090904 A1 | 5/2003 | Ching | |
| 2003/0137847 A1 | 7/2003 | Cooper | |
| 2003/0174503 A1 | 9/2003 | Yueh | |
| 2006/0008687 A1 | 1/2006 | Kaye et al. | |
| 2006/0146550 A1 | 7/2006 | Simpson et al. | |
| 2006/0279948 A1 | 12/2006 | Tsai | |
| 2010/0085757 A1 | 4/2010 | Barkdoll et al. | |
| 2010/0142213 A1 | 6/2010 | Biggie et al. | |
| 2012/0033415 A1 | 2/2012 | Sharrah et al. | |
| 2012/0140455 A1 | 6/2012 | Chang | |
| 2013/0058078 A1 | 3/2013 | Meng | |
| 2013/0258645 A1 | 10/2013 | Weber et al. | |
| 2013/0265780 A1 | 10/2013 | Choksi et al. | |
| 2013/0322073 A1 | 12/2013 | Hamm et al. | |
| 2014/0150834 A1 * | 6/2014 | Nootenboom | F16B 7/1463 135/75 |
| 2014/0218936 A1 | 8/2014 | Mahling et al. | |
| 2014/0338950 A1 * | 11/2014 | Lutnesky | B65H 75/48 174/69 |
| 2015/0192243 A1 | 7/2015 | Sharrah et al. | |
| 2016/0084431 A1 | 3/2016 | Chen et al. | |
| 2016/0161050 A1 | 6/2016 | Trebesius et al. | |
| 2016/0258601 A1 | 9/2016 | Gowanlock | |
| 2016/0298831 A1 | 10/2016 | Fang | |
| 2016/0312967 A1 | 10/2016 | Harvey et al. | |
| 2018/0149344 A1 | 5/2018 | Cornell et al. | |

FOREIGN PATENT DOCUMENTS

| | | |
|---|---|---|
| KR | 20020075357 A | 10/2002 |
| WO | WO 0244503 A1 | 6/2002 |
| WO | WO 2014083117 A1 | 6/2014 |
| WO | WO 2015080767 A1 | 6/2015 |

OTHER PUBLICATIONS

International Search Report and Written Opinion for Application No. PCT/US2018/054658 dated Jan. 29, 2019, 11 pages.
International Search Report and Written Opinion for Application No. PCT/US2017/062962 dated Apr. 16, 2018, 10 pages.

* cited by examiner

STANDING TOOL WITH TELESCOPIC ARM HAVING A GUIDE ROD

CROSS-REFERENCE TO RELATED APPLICATIONS

This patent application claims priority to Provisional Patent Application No. 62/713,885 filed Aug. 2, 2018, which is hereby incorporated by reference.

FIELD OF THE INVENTION

The present disclosure relates to standing tools, and more specifically a standing tool with a telescopic arm.

BACKGROUND

Some standing tools, such as site lights, include adjustable (e.g., telescoping) arms to allow head units to be selectively elevated for use. Cables or wires generally extend through the adjustable arms to provide power to the head units.

SUMMARY

In one embodiment, a standing tool includes a body, a telescoping arm defining an axis therethrough, the telescoping arm also having a base end coupled to the body, and a distal end movable with respect to the base end, a head unit coupled to the distal end of the telescoping arm and movable together therewith, a cable having a first end fixed relative to the body, and a second end opposite the first end that is fixed relative to the head unit, and a guide rod coaxially aligned with the axis of the telescoping arm, where at least a portion of the cable is wrapped around the guide rod.

In another embodiment, a standing tool includes a body, a telescoping arm defining an axis therethrough, the telescoping arm having a base end coupled to the body, and a distal end movable with respect to the base end, a head unit coupled to the distal end of the telescoping arm and movable together therewith, a cable extending between and in electrical communication with the body and the head unit, where the cable includes a spiral portion including a series of coils that together form a passageway, and a guide rod fixed relative to the base end or the distal end of the telescoping arm, and where at least a portion of the guide rod is positioned within the passageway.

In another embodiment, a standing tool includes a body, a telescoping arm having a base end coupled to the body and a distal end movable with respect to the base end, where the telescoping arm is adjustable between an extended position, in which the distal end is a first distance from the base end, and a retracted position, in which the distal end is a second distance from the base end that is less than the first distance. The standing tool also includes a head unit coupled to the distal end of the telescoping arm and movable together therewith, a cable including a spiral portion including a plurality of coils that together form a passageway, and a guide rod fixed relative to one of the base end and the distal end, where a first number of coils of the spiral portion wrap around the guide rod when the telescoping arm is in the retracted position, and where a second number of coils different than the first number of coils wrap around the guide rod when the telescoping arm is in the extended position.

DETAILED DESCRIPTION

Figure 1A:
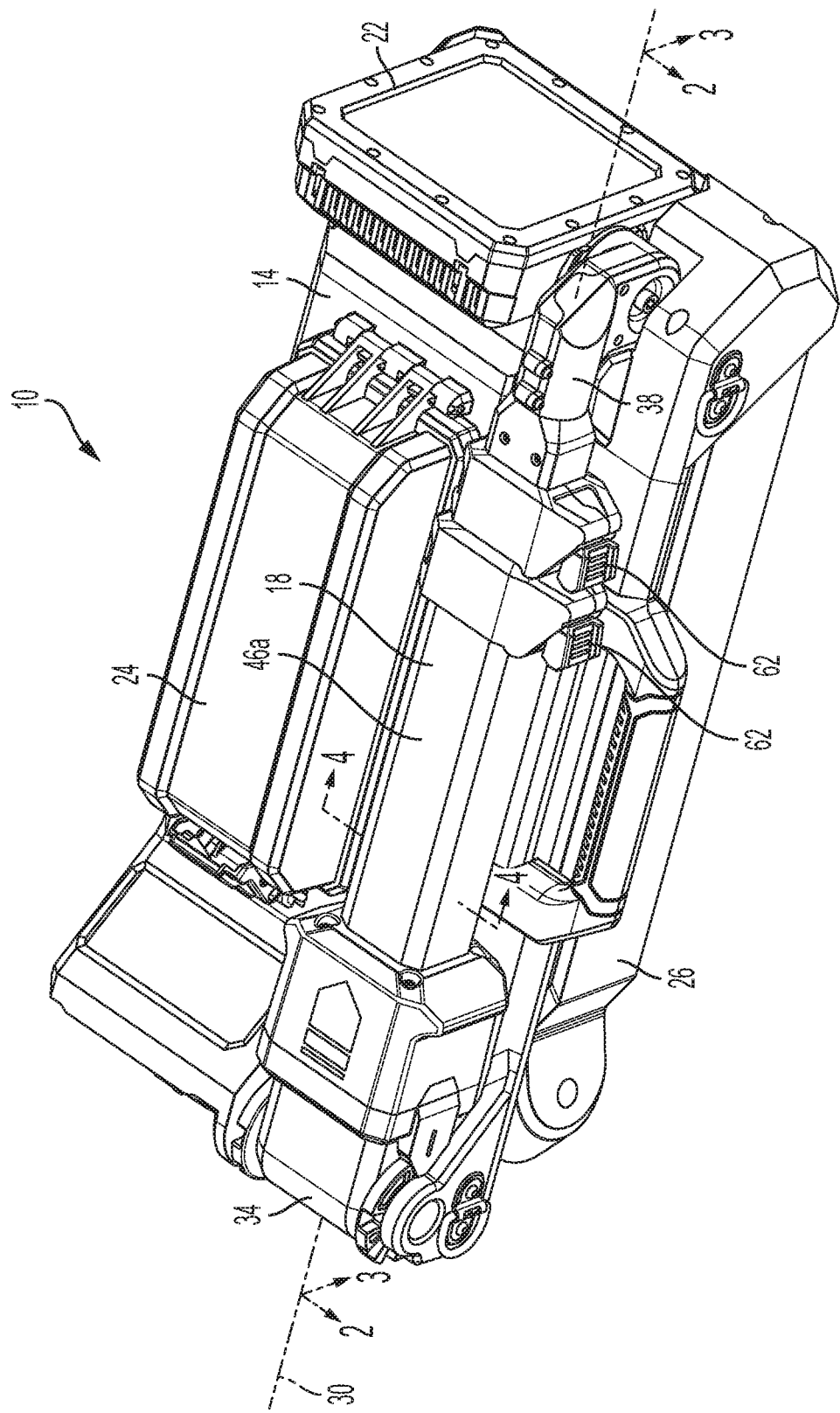
FIG. 1A is a perspective view of a standing tool including a telescoping arm in a retracted position.

Before any constructions of the disclosure are explained in detail, it is to be understood that the disclosure is not limited in its application to the details of construction and the arrangement of components set forth in the following description or illustrated in the following drawings. The disclosure is capable of other constructions and of being practiced or of being carried out in various ways.

FIGS. 1A-6 illustrate a mobile standing tool 10 including a body 14, a telescopic arm 18 supported by the body 14, and a head unit 22 coupled to the telescopic arm 18 and movable relative to the body 14. In some embodiments, the standing tool 10 may be a site light having a light assembly for the head unit 22. In other embodiments, the head unit 22 of the standing tool 10 may include a camera or imaging unit, a fan, a speaker, a canopy, and/or other implements that may be desirable to deploy at an elevated height in a jobsite.

Illustrated in FIGS. 1A-3, the body 14 of the standing tool 10 acts as a foundation for the tool 10, providing support and stability for the telescopic arm 18 and selectively maintaining the arm 18 in a substantially vertical orientation. The body 14 also includes a power unit 24 configured to provide electrical power to the head unit 22. The illustrated power unit 24 includes a battery pack, such as a rechargeable power tool battery pack. In other constructions, the standing tool 10 may be plugged into an AC power source, such as a wall outlet or generator. In some instances, the body 14 may include deployable feet 26 to help improve the stability of the body 14 during operation. Still further, the body 14 may include wheels (not shown) to aid the user in maneuvering the standing tool 10 over a support surface.

As illustrated in FIGS. 1A-6, the telescopic arm 18 of the standing tool 10 is coupled to the body 14 and defines an axis 30 therethrough. The arm 18 includes a base end 34, and a distal end 38 opposite the base end 34 to define an arm length 42 therebetween. When assembled, the base end 34 of the arm 18 is coupled to the body 14, while the distal end 38 is coupled to the head unit 22. During use, the arm 18 is configured to adjust the position of the head unit 22 relative to the body 14 by changing the arm length 42.

As shown in FIGS. 2-6, the arm 18 includes the plurality of concentric tubes 46 nested in order of decreasing width with sufficient clearance therebetween to allow each tube 46 to move axially with respect to one another. More specifically, the arm 18 includes an outermost tube 46a (e.g., the tube with largest cross-sectional width), an innermost tube 46b (e.g., the tube with the smallest cross-sectional width), and one or more intermediate tubes 46c positioned therebetween. Each tube 46a, 46b, 46c is substantially elongated in shape having a first end 50 and a second end 54 opposite the first end 50. Each tube 46a, 46b, 46c also defines a corresponding channel 58 therethrough. Together, the channels 58 of each tube 46 form a common arm volume 52. In the illustrated embodiment, each tube 46 includes a polygonal cross-sectional shape restricting relative rotation between the tubes 46 during use.

Once assembled, the second end 54 of the outermost tube 46a is fixedly mounted to the base body 14 (e.g., forms the base end 34), while the first end 50 of the innermost tube 46b is coupled to the head unit 22 for axial movement together therewith (e.g., forms the distal end 38).

During use, the arm 18 is continuously adjustable between a retracted position (see FIGS. 1A and 5), where the arm 18 produces a first arm length 42 (e.g., when the second ends 54 of each tube 46 are positioned adjacent one another), and an extended position (see FIGS. 1B and 6), where the arm 18 produces a second arm length 42 that is greater than the first arm length 42 (e.g., when the second end 54 of each tube 46 is positioned proximate the first end 50 of the immediately adjacent tube 46 positioned radially outward thereof). The arm 18 is also adjustable to partially extended positions, where the arm length 42 is greater than the first arm length 42, but less than the second arm length 42. As the arm length 42 changes, the axial height of the common arm volume 52 also changes. More specifically, the common arm volume 52 has a first axial volume height when the arm 18 is in the retracted position, and a second axial volume height greater than the first axial volume height when the arm 18 is in the extended position.

Figure 3:
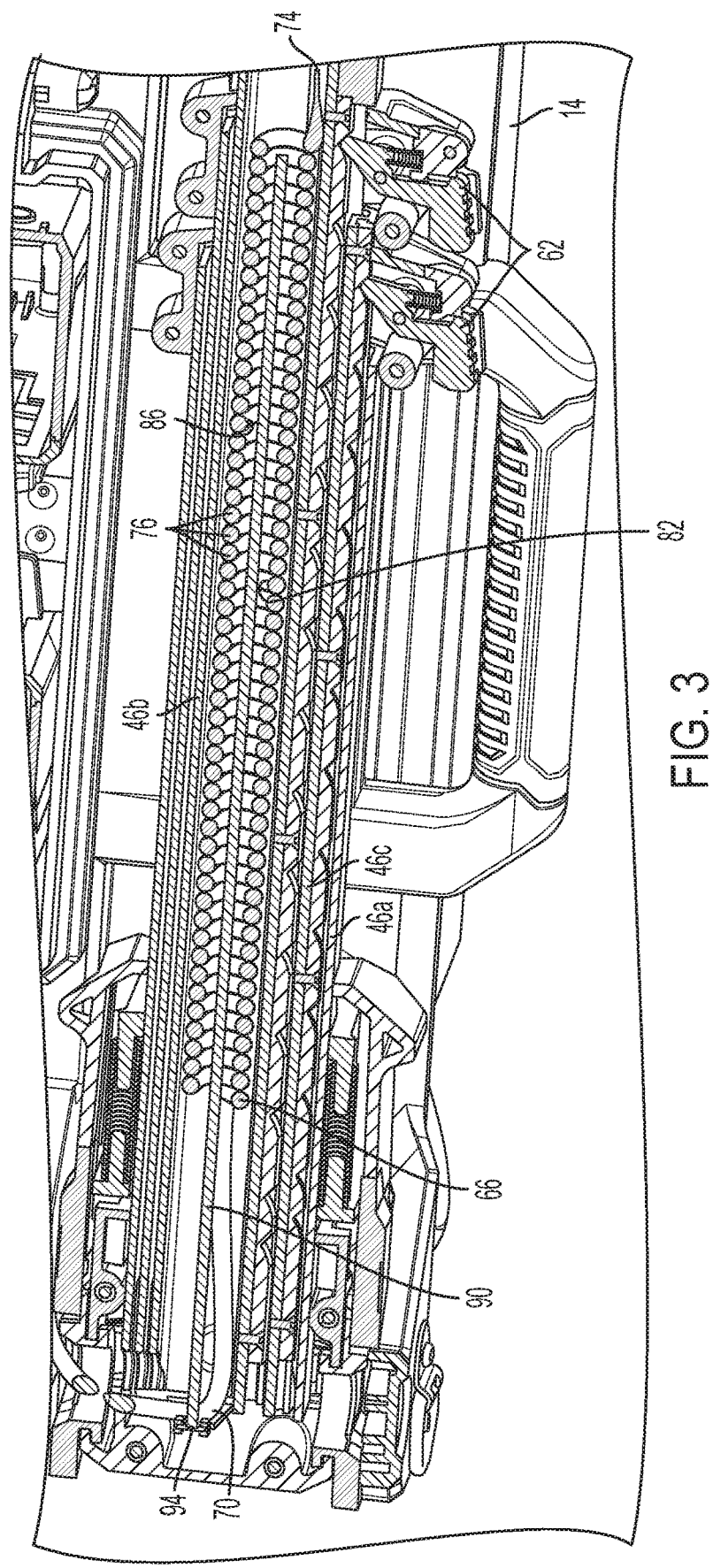
FIG. 3 is a cross-sectional view of the standing tool taken along line 3-3 of FIG. 1A.
Figure 4:
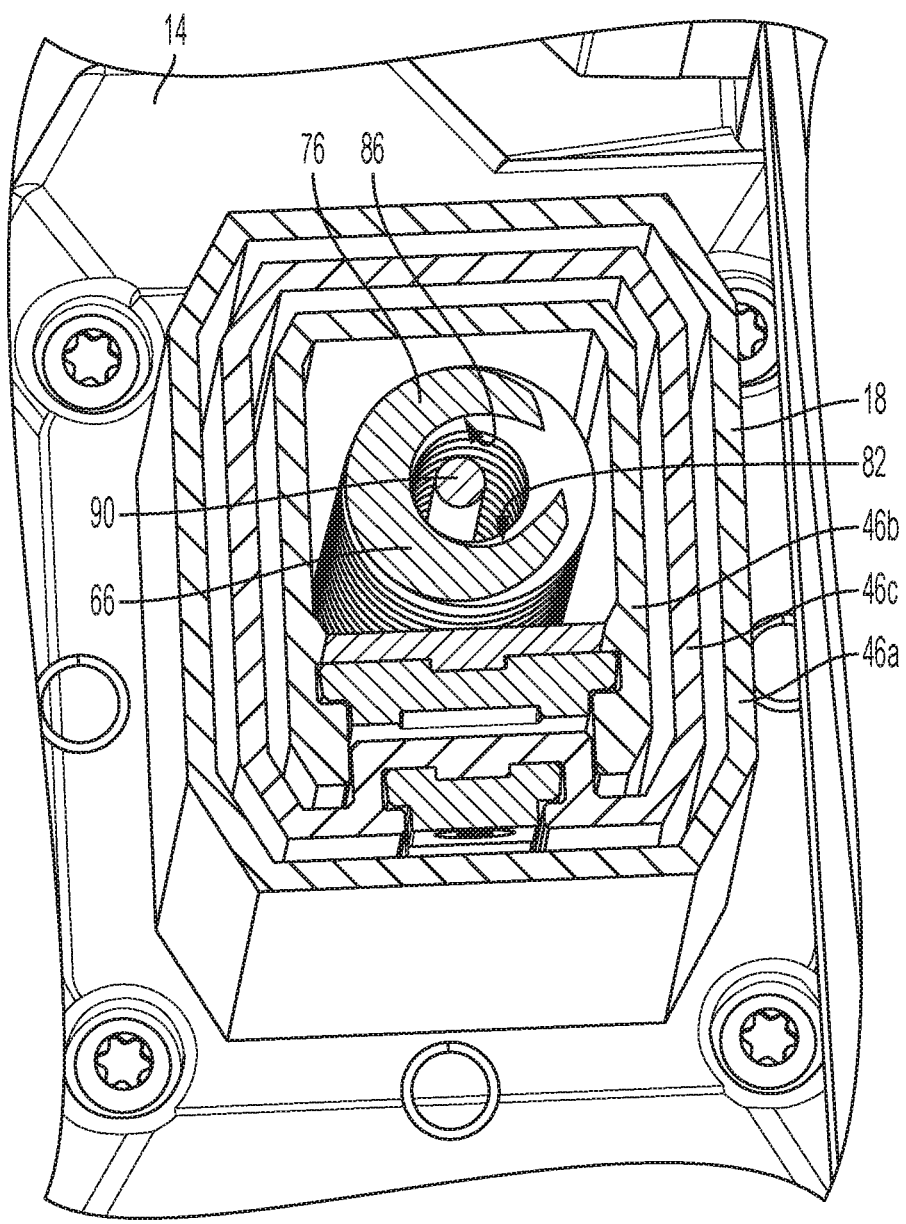
FIG. 4 is a cross-sectional view of the standing tool taken along line 4-4 of FIG. 1A.

As shown in FIG. 3, each tube 46 also includes a latch 62 coupled thereto that is configured to selectively engage an adjacent tube. More specifically, each latch 62 is adjustable between a locked configuration, where the tube 46 to which the latch 62 is attached and an adjacent tube are fixed relative to one another, and an unlocked configuration (not shown), where the tube 46 to which the latch 62 is attached and the adjacent tube 46 are axially movable relative to one another. In the illustrated embodiment, the arm 18 includes one latch 62 for each tube 46 (except for the innermost tube 46b). Furthermore, each latch 62 is configured to releasably engage the adjacent tube positioned radially inward of the tube 46 to which the latch 62 is attached.

As shown in FIGS. 2-6, the arm 18 of the standing tool 10 also includes a cable or spring wire 66 in electrical communication with both the power unit 24 and the head unit 22 to transmit electrical power therebetween. More specifically, the cable 66 includes a first end 70 electrically coupled to the power unit 24, a second end 74 electrically coupled to the head unit 22, and an elongated body 78 extending between the first end 70 and the second end 74. In the illustrated embodiment, the distance between the first end 70 and the second end 74 defines a cable length 68 of the cable 66.

In the illustrated embodiment, at least a portion of the body 78 of the cable 66 includes a spiral portion 72 including a series of coils 76 that together form a passageway 82 having an inner diameter 86. The coils 76 of the spiral portion 72 allow the cable 66 to compensate for changes in the overall cable length 68 by coiling and uncoiling in response to movement between the first end 70 and the second end 74 of the cable 66. When assembled, the cable 66 is at least partially positioned within the arm volume 52 and extends axially along the length thereof with the first end 70 of the cable 66 fixed relative to the distal end 38 of the arm 18 and the second end 74 of the cable 66 fixed relative to the base end 34 of the arm 18. More specifically, the cable 66 is positioned within the arm volume 52 such that the axis 30 of the arm 18 passes through and is aligned with the passageway 82.

During use, changing the arm length 42 causes a corresponding change in cable length 68. More specifically, increasing the arm length 42 causes the cable length 68 to increase, which causes the coils 76 of the cable 66 begin to uncoil and reduce the inner diameter 86 of the passageway 82 (e.g., the cable 66 is stretched). In contrast, reducing the arm length 42 causes the cable length 68 to decrease, which causes the coils 76 of the cable 66 to re-coil and increases the inner diameter 86 of the passageway 82. In the illustrated embodiment, the cable 66 is elastically deformable such that it biases toward a natural or rested position. In the present embodiment, the rested position generally corresponds with the arm 18 being in the retracted position (e.g., a relatively short cable length 68 and large inner diameter 86).

Illustrated in FIGS. 2-6, the standing tool 10 also includes a guide rod 90 positioned within the arm volume 52 and configured to guide or orient the cable 66 within the arm volume 52 as the cable 66 uncoils and re-coils during use. More specifically, the guide rod 90 includes a base end 94 fixedly coupled to the base end 34 of the arm 18, and an elongated body 98 extending from the base end 94 to produce a distal end 102. In the illustrated embodiment, the body 98 of the guide rod 90 extends along and is substantially aligned with the axis 30 of the arm 18. Still further, the body 98 extends from the base end 94 beyond the first end 50 of the outermost tube 46a such that the guide rod 90 is longer in length than the outermost tube 46a (see FIGS. 5 and 6). Stated differently, the guide rod 90 is of sufficient length so that the body 98 is axially aligned with at least two tubes 46 when the arm 18 is in the extended position. The outer diameter of the guide rod 90 is smaller than the reduced diameter of the passageway 82.

Figure 5:
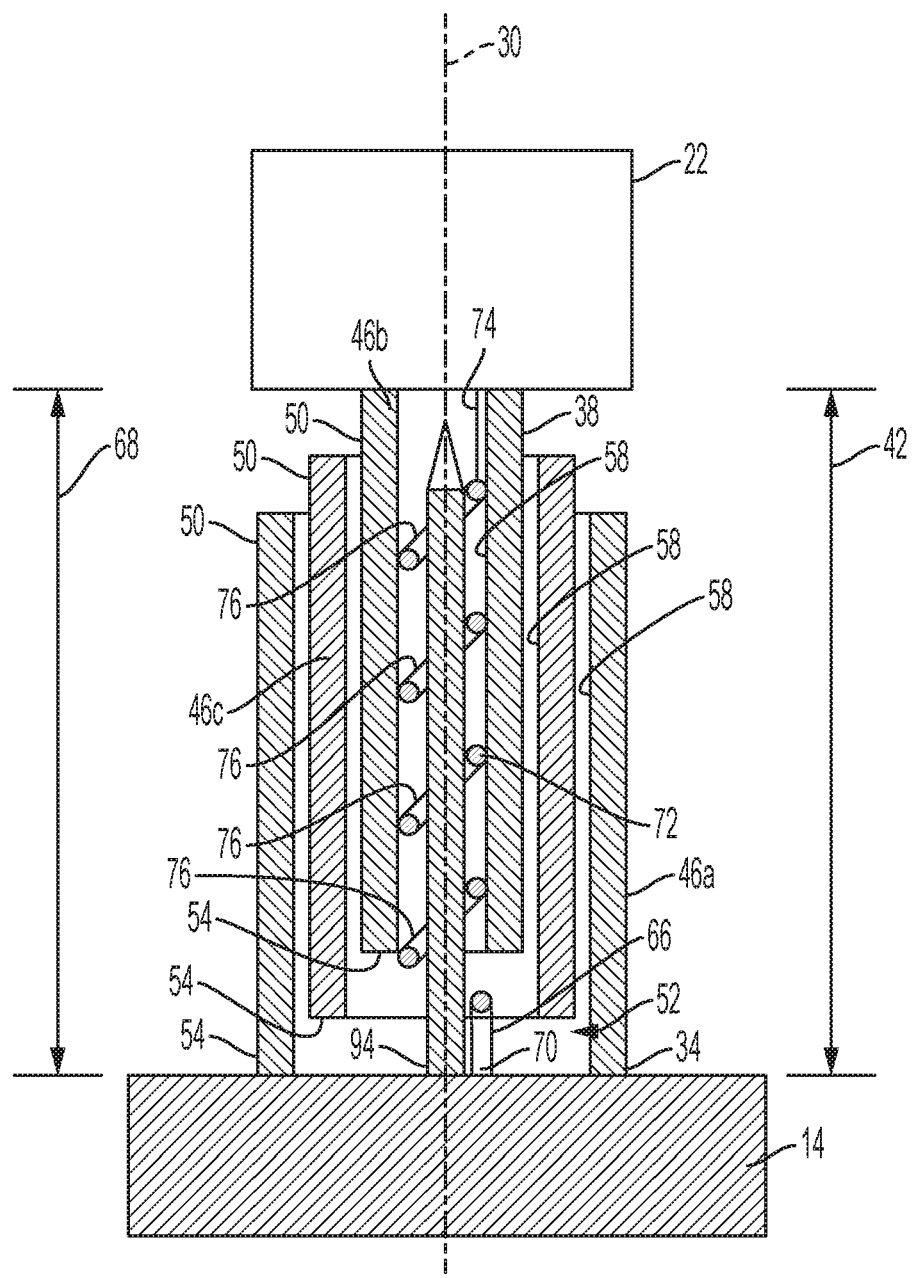
FIG. 5 is a schematic view of the telescoping arm of the standing tool of FIG. 1A in the retracted position.
Figure 6:
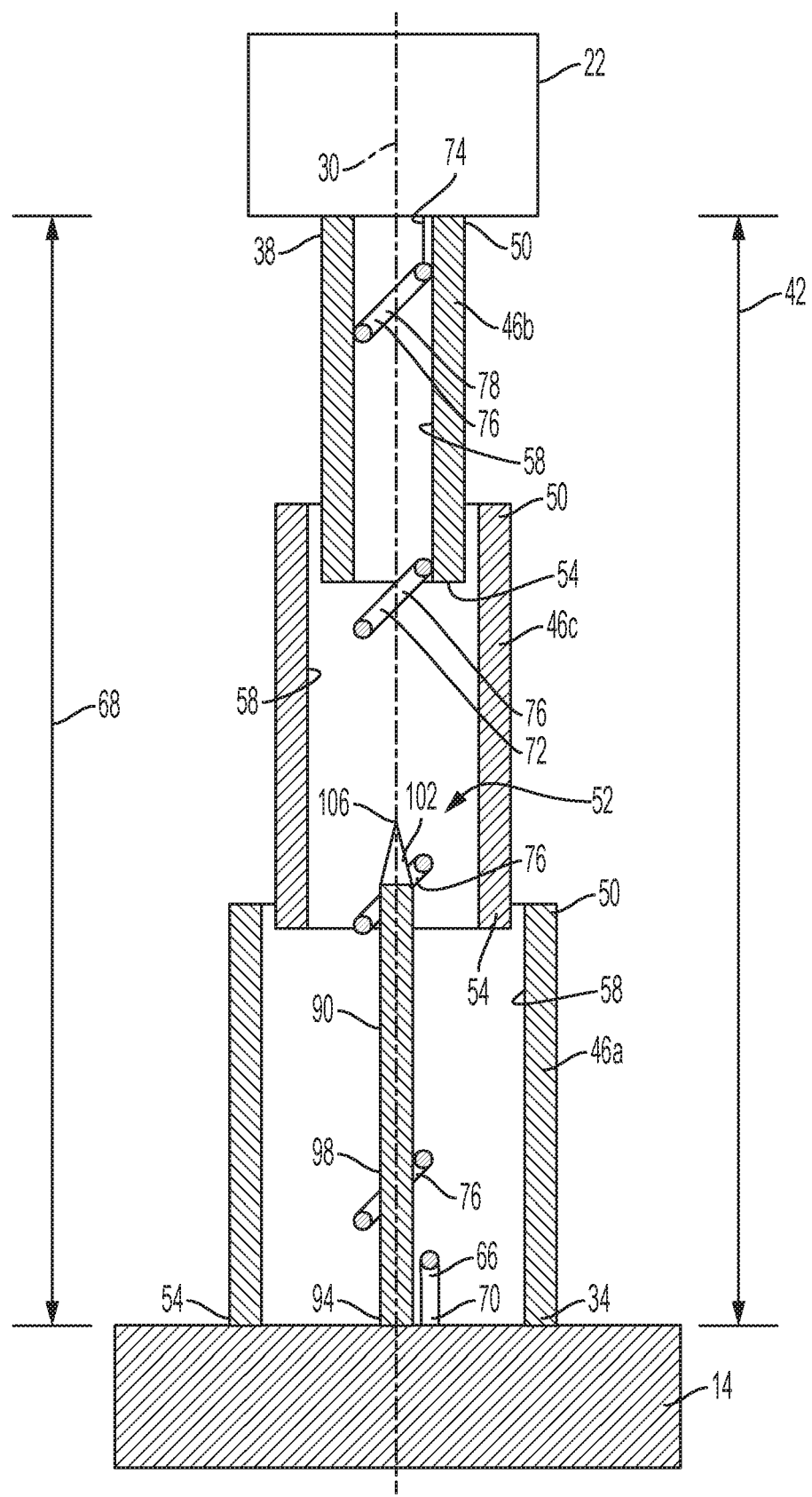
FIG. 6 is a schematic view of the telescoping arm of the standing tool of FIG. 1A in the extended position.

As shown in FIGS. 5 and 6, the distal end 102 of the guide rod 90 includes a contoured tip 106 to allow the distal end 102 of the rod 90 to more easily pass though the passageway 82 as the cable 66 re-coils and shortens in axial length. More specifically, the contoured tip 106 is able to more easily pass through each individual coil 76 as the coils 76 recoil back onto the guide rod 90 during use. In the illustrated embodiment, the contoured tip 106 is generally tapered, beveled, or conical in shape. In other embodiments, the contoured tip 106 may have other suitable configurations, such as round.

In the illustrated embodiment, the guide rod 90 is formed from fiberglass. However, in alternative embodiments the guide rod 90 may be formed from any suitable rigid materials such as, but not limited to, metal, polycarbonate, wood, and the like. Furthermore, while the illustrated guide rod 90 is coupled to and fixed relative to the outermost tube 46a (e.g., the base end 34 of the arm 18), in alternative embodiments the guide rod 90 may be coupled to and movable together with the innermost tube 46b (e.g., the distal end 38 of the arm). In still other embodiments, the guide rod 90 may have an adjustable length with a first end fixedly coupled to the outermost tube 46a and a second end fixedly coupled to the innermost tube 46b. In such embodiments, the guide rod 90 may be flexible (e.g., elastic), telescoping, and the like.

Figure 1B:
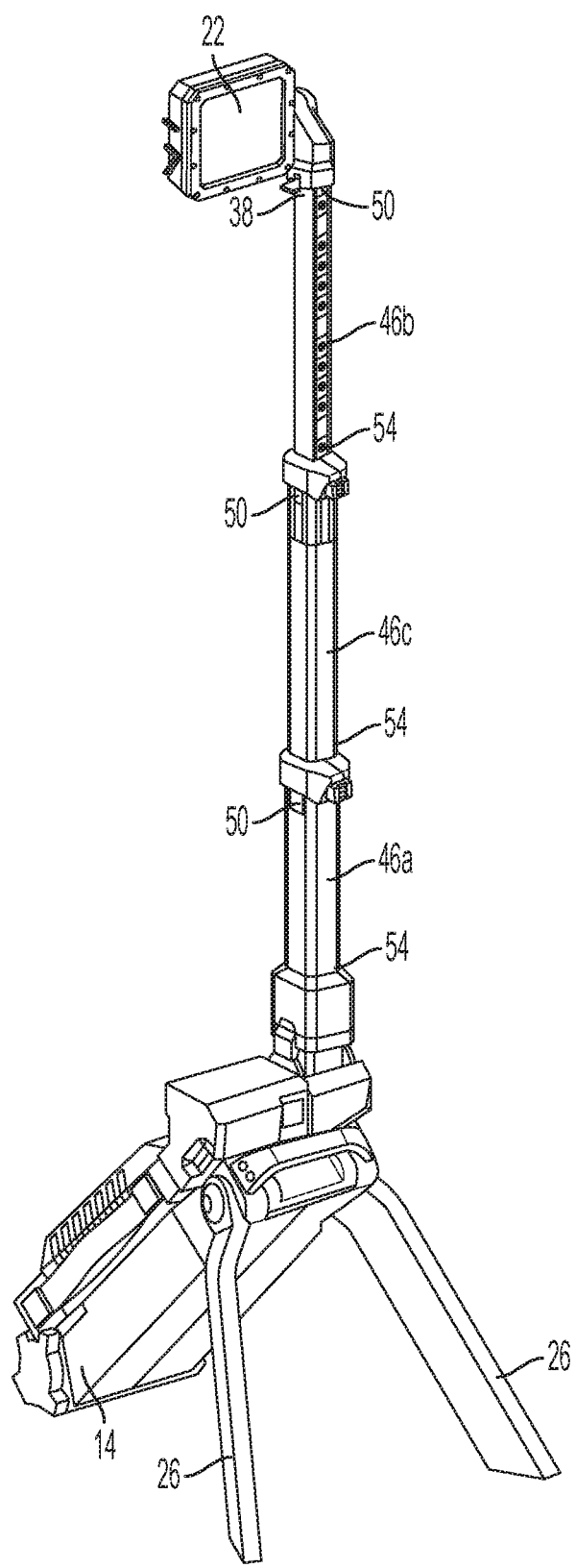
FIG. 1B is a perspective view of the standing tool of FIG. 1A with the telescoping arm in an extended position.
Figure 2:
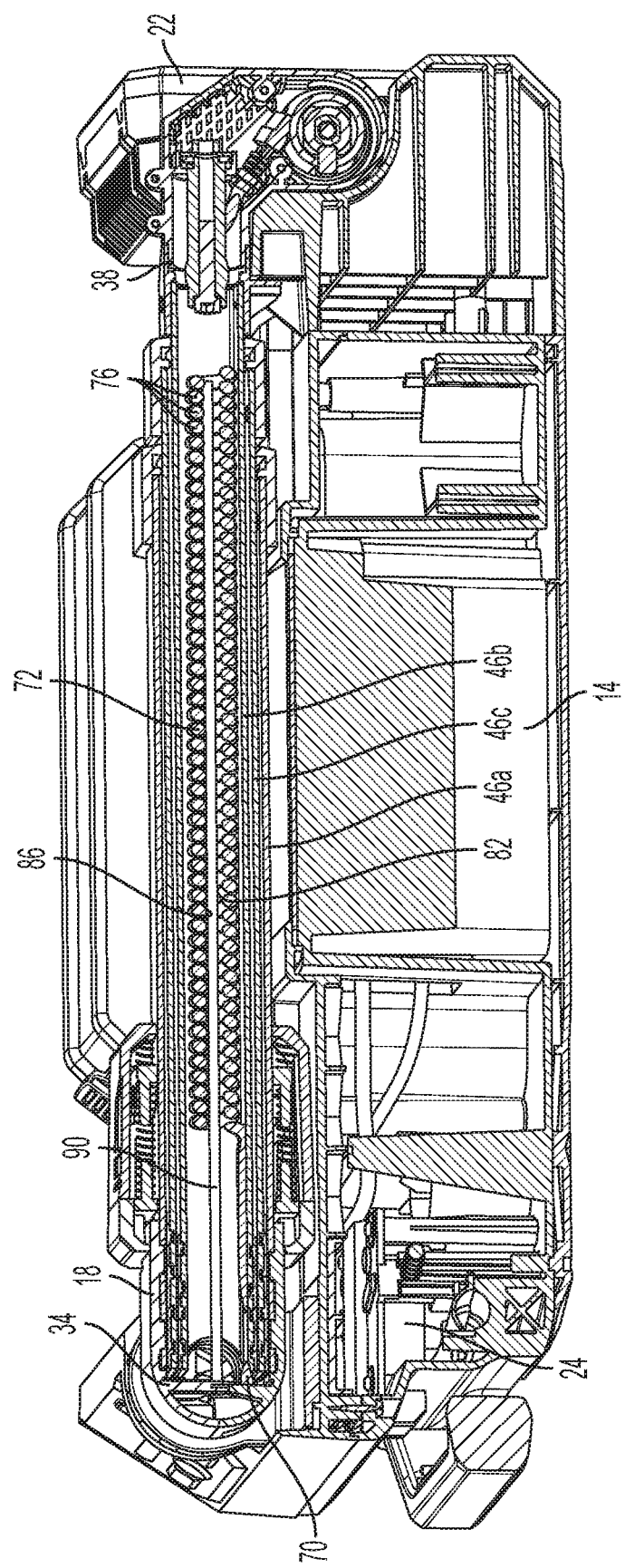
FIG. 2 is a cross-sectional view of the standing tool taken along line 2-2 of FIG. 1A.
Figure 7A:
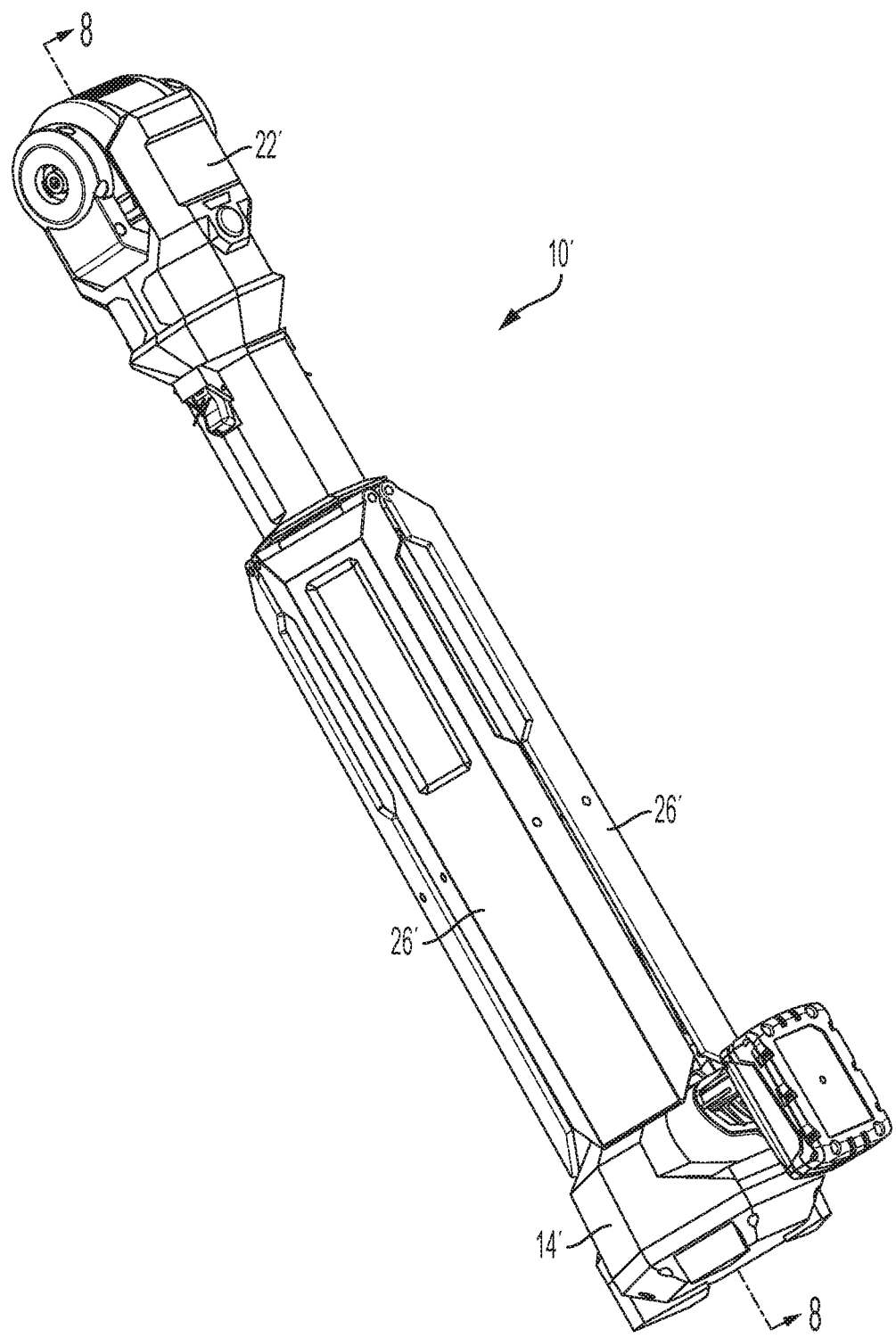
FIG. 7A is a perspective view of another standing tool including a telescoping arm in a retracted position.
Figure 7B:
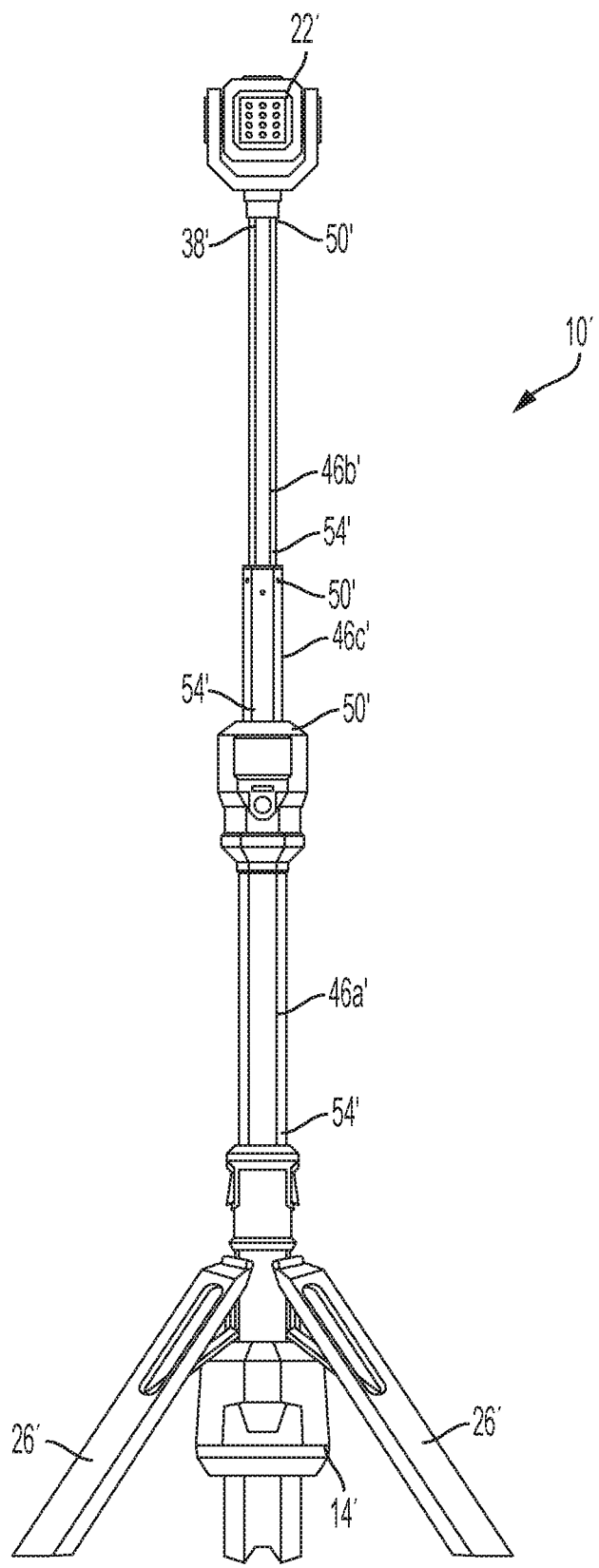
FIG. 7B is a perspective view of the standing tool of FIG. 7A with the telescoping arm in an extended position.
Figure 8:
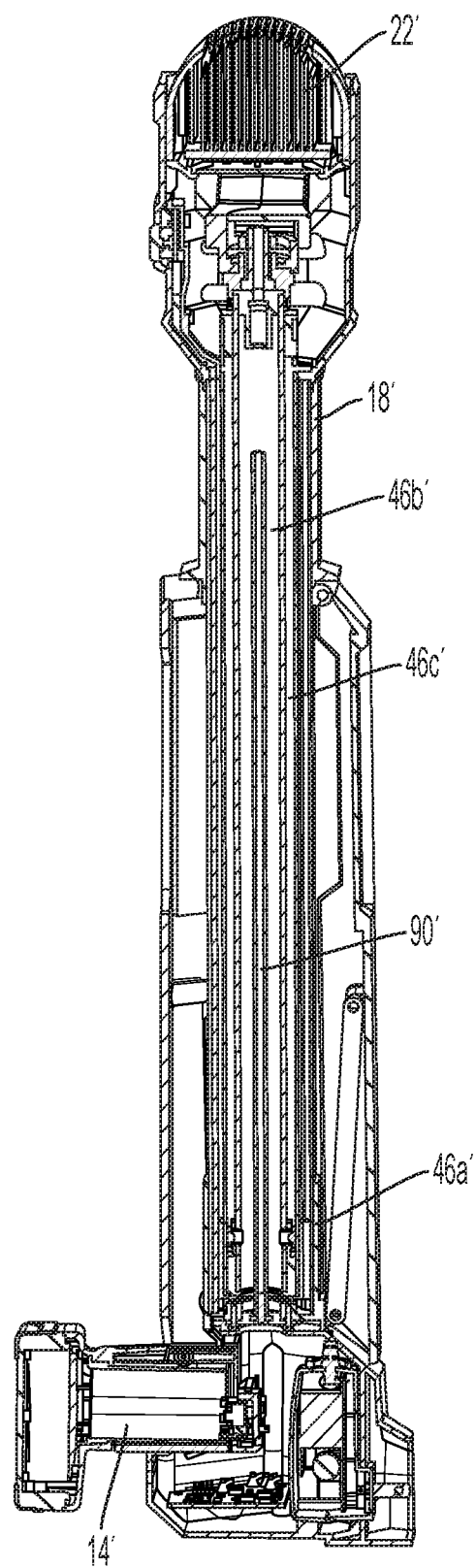
FIG. 8 is a cross-sectional view of the standing tool taken along line 8-8 of FIG. 7A.
Figure 9:
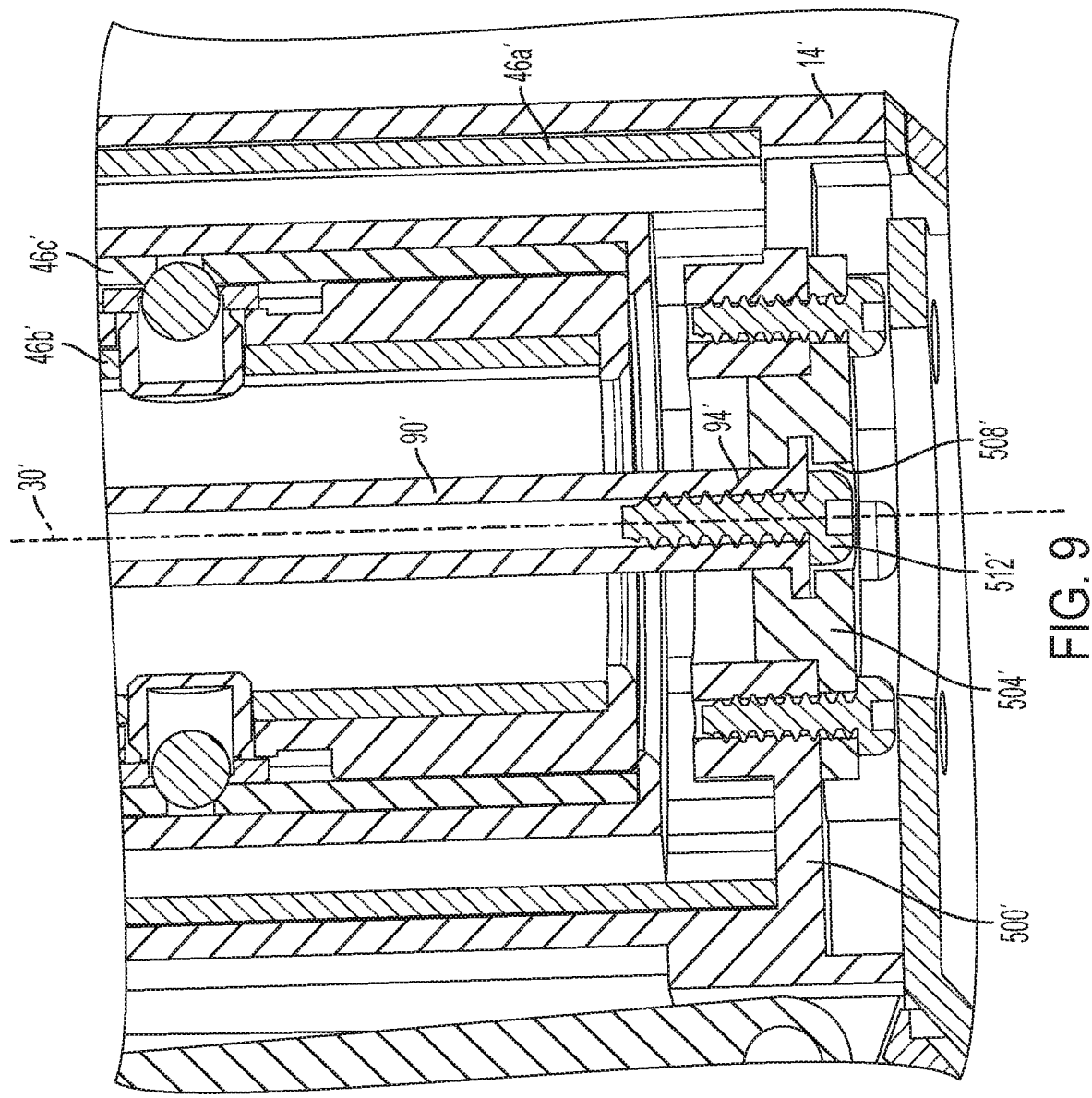
FIG. 9 is a detailed view of a base of the telescoping arm of FIG. 8.

To deploy the standing tool 10, the user first places the body 14 of the standing tool 10 in the desired position, deploying any adjustable feet 26 or support elements as necessary to produce the desired stability (see FIGS. 1B and 7B). With the body 14 in place, the user may then orient the axis 30 of the arm 18 in a substantially vertical orientation with the arm 18 in the retracted position. In the retracted position, the arm length 42 and cable length 68 are at a minimum. As such, a first number of coils 76 of the cable body 78 (e.g., four coils 76) wrap around the guide rod 90 (see FIG. 5).

With the standing tool 10 positioned, the user may then extend the arm 18 either by manually deploying each tube 46 individually or through an automatic assembly. During the deployment process, the arm length 42 increases, causing a corresponding increase in the cable length 68. As such, the coils 76 of the cable 66 uncoil (e.g., increase in axial length) and move axially along the guide rod 90 toward and beyond the distal end 102.

Once the arm 18 reaches and is locked into the extended position (see FIG. 6), the cable length 68 has been increased such that a second number of coils 76 of the cable body 78 (e.g., two coils) now wrapped around the guide rod 90 that is less than the first number of coils 76 that initially wrapped around the guide rod 90 when the arm 18 was in the retracted position. Stated differently, one or more coils have moved axially beyond the tip 106 of the guide rod 90.

To return the arm 18 to the retracted configuration, the user begins shortening the arm length 42. This causes a corresponding reduction in the cable length 68. As such, the coils 76 of the cable 66 begin to recoil (e.g., decrease in axial length) and axially move toward the base end 94 of the guide rod 90. While doing so, coils 76 that are positioned axially beyond the tip 106 are directed onto the guide rod 90 by the conical tip 106. As such, the guide rod 90 maintains the cable 66 in a substantially aligned orientation as it collapses and returns back to its initial rest state. This avoids any kinking or bunching that may occur if the cable 66 was left to collapse unassisted.

Once the arm 18 has returned to the retracted configuration, the user is then free to pack up the standing tool 10 for subsequent use.

FIGS. 7A-9 illustrate another embodiment of the standing tool 10'. The standing tool 10' is substantially similar to the standing tool 10 described above. As such, only the difference between the two devices will be described herein. The standing tool 10' includes a base member 500' (FIG. 9) that is formed with the body 14' and that is fixedly coupled to the outermost tube 46a' and the guide rod 90'. A disk 504' is fixedly coupled to the base member 500'. The disk 504' includes an aperture 508' positioned proximate the center thereof. The aperture 508' is substantially aligned with the axis 30' of the telescopic arm 18'. When assembled, the base end 94' of the rod 90' is fixedly coupled to the disk 504' with a fastener 512' (e.g., a screw, a bolt, etc.) such that the rod 90' is fixed relative to the outermost tube 46a' and positioned coaxial with the axis 30'.

Although the invention has described with reference to certain preferred embodiments, variations exist within the scope and spirit of one or more independent aspects of the invention. Various features and advantages of the invention are set forth in the following claims.

The invention claimed is:

1. A standing tool comprising:
   a body;
   a telescoping arm defining an axis therethrough, the telescoping arm also having a base end coupled to the body, and a distal end movable with respect to the base end;
   a head unit coupled to the distal end of the telescoping arm and movable together therewith;
   a cable having a first end fixed relative to the body, and a second end opposite the first end that is fixed relative to the head unit; and
   a guide rod coaxially aligned with the axis of the telescoping arm and fixed relative to the base end thereof, wherein at least a portion of the cable is wrapped around the guide rod; and
   wherein the guide rod includes a distal end opposite the base end, and wherein the distal end is stationary relative to the base end of the telescoping arm.

2. The standing tool of claim 1, wherein the telescoping arm includes a plurality of concentric tubes nested in order of decreasing width.

3. The standing tool of claim 1, wherein the head unit includes at least one of a light assembly, a camera, a fan, a speaker, and a canopy.

4. The standing tool of claim 1, wherein the telescoping arm at least partially defines an internal volume therein, and wherein both the guide rode and cable are at least partially positioned within the internal volume.

5. The standing tool of claim 1, wherein the distal end includes a contoured tip.

6. The standing tool of claim 5, wherein the contoured tip is conical in shape.

7. The standing tool of claim 1, wherein the cable is in electrical communication with the head unit and the body.

8. The standing tool of claim 1, wherein the cable includes an elongated body extending between the first end and the second end, and wherein the elongated body includes a spiral portion having a series of coils that together form a passageway.

9. The standing tool of claim 8, wherein at least a portion of the guide rod is positioned within the passageway.

10. A standing tool comprising:
    a body;
    a telescoping arm defining an axis therethrough, the telescoping arm having a base end coupled to the body, and a distal end movable with respect to the base end, and wherein the telescoping arm defines an internal volume therein;
    a head unit coupled to the distal end of the telescoping arm and movable together therewith;
    a cable extending between and in electrical communication with the body and the head unit, wherein the cable includes a spiral portion including a series of coils that together form a passageway; and
    a guide rod fixed relative to the base end or the distal end of the telescoping arm, and wherein at least a portion of the guide rod is positioned within the passageway; and
    wherein the cable and the guide rod are positioned within the internal volume.

11. The standing tool of claim 10, wherein the cable includes a first end fixed relative to the base end of the telescoping arm, and a second end fixed relative to the distal end of the telescoping arm.

12. The standing tool of claim 10, wherein the guide rod is coaxially aligned with the axis of the telescoping arm.

13. A standing tool comprising:
    a body;
    a telescoping arm having a base end coupled to the body and a distal end movable with respect to the base end, wherein the telescoping arm is adjustable between an extended position, in which the distal end is a first distance from the base end, and a retracted position, in which the distal end is a second distance from the base end that is less than the first distance;

a head unit coupled to the distal end of the telescoping arm and movable together therewith;

a cable including a spiral portion including a plurality of coils that together form a passageway; and a guide rod fixed relative to one of the base end and the distal end, wherein a first number of coils of the spiral portion wrap around the guide rod when the telescoping arm is in the retracted position, and wherein a second number of coils different than the first number of coils wrap around the guide rod when the telescoping arm is in the extended position.

14. The standing tool of claim 13, wherein the second number of coils is less than the first number of coils.

15. The standing tool of claim 13, wherein the telescoping arm at least partially defines an interior volume therein, and wherein the interior volume has a first height when the telescoping arm is in the retracted position, and a second height larger than the first height when the telescoping arm is in the extended position.

16. The standing tool of claim 15, wherein the guide rod has a rod length, and wherein the rod length is less than or equal to the second height.

17. The standing tool of claim 15, wherein the cable and the guide rod are at least partially positioned within the interior volume.

18. The standing tool of claim 13, wherein the cable includes a first end fixed relative to the distal end of the telescoping arm, and a second end fixed relative to the base end of the telescoping arm.

19. The standing tool of claim 13, wherein the cable is in electrical communication with the head unit and the body.

* * * * *